United States Patent
Lee

(10) Patent No.: US 11,962,581 B2
(45) Date of Patent: Apr. 16, 2024

(54) VEHICLE CONTROL METHOD AND SMART CAR KEY

(71) Applicants: FUDING PRECISION COMPONENTS (SHENZHEN) CO., LTD., Shenzhen (CN); FOXCONN INTERCONNECT TECHNOLOGY LIMITED, Grand Cayman (KY)

(72) Inventor: Chia-Yen Lee, New Taipei (TW)

(73) Assignees: FUDING PRECISION COMPONENTS (SHENZHEN) CO., LTD., Shenzhen (CN); FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 763 days.

(21) Appl. No.: 17/084,927

(22) Filed: Oct. 30, 2020

(65) Prior Publication Data

US 2021/0377261 A1    Dec. 2, 2021

(30) Foreign Application Priority Data

Jun. 1, 2020   (CN) .......................... 202010484972.8

(51) Int. Cl.
*G06K 7/10* (2006.01)
*B60R 25/01* (2013.01)
(Continued)

(52) U.S. Cl.
CPC .......... *H04L 63/0853* (2013.01); *B60R 25/01* (2013.01); *B60R 25/10* (2013.01);
(Continued)

(58) Field of Classification Search
CPC ........ B60R 2325/103; B60R 2325/205; B60R 25/01; B60R 25/10; B60R 25/24;
(Continued)

(56) References Cited

U.S. PATENT DOCUMENTS

| | | | |
|---|---|---|---|
| 10,891,815 B2* | 1/2021 | Endo | G07C 9/00309 |
| 11,558,906 B2* | 1/2023 | Staats | H04W 12/06 |

(Continued)

FOREIGN PATENT DOCUMENTS

| | | |
|---|---|---|
| CN | 104670158 | 11/2016 |
| CN | 105083214 | 9/2018 |

(Continued)

*Primary Examiner* — Tyler J Lee
(74) *Attorney, Agent, or Firm* — ScienBiziP, P.C.

(57) ABSTRACT

A vehicle control method applied to a smart car key includes receiving a connection request sent by a mobile terminal, establishing a communication connection with the mobile terminal in response to the connection request, receiving identity information and authorization request information sent by the mobile terminal, determining whether the identity information is correct, and in response that the identity information is correct, sending pairing information to the mobile terminal in response to the authorization request information and sending the identity information to a vehicle to be controlled. The mobile terminal controls the vehicle through the pairing information and the identity information to perform at least one operation.

10 Claims, 8 Drawing Sheets

(51) Int. Cl.
*B60R 25/10* (2013.01)
*B60R 25/24* (2013.01)
*G06K 7/14* (2006.01)
*H04L 9/40* (2022.01)

(52) U.S. Cl.
CPC .......... *B60R 25/24* (2013.01); *G06K 7/10366* (2013.01); *G06K 7/1413* (2013.01); *G06K 7/1417* (2013.01); *B60R 2325/103* (2013.01); *B60R 2325/205* (2013.01)

(58) Field of Classification Search
CPC ............. G06K 7/10366; G06K 7/1413; G06K 7/1417; H04L 63/0853; H04W 12/06; H04W 12/63; H04W 4/80
See application file for complete search history.

(56) References Cited

U.S. PATENT DOCUMENTS

| | | | | |
|---|---|---|---|---|
| 2014/0064488 A1* | 3/2014 | Ho | ........................ | H04W 12/50 |
| | | | | 380/270 |
| 2017/0272418 A1* | 9/2017 | Kim | ........................ | H04L 63/08 |
| 2020/0356651 A1* | 11/2020 | Yen | ........................ | G06F 21/42 |
| 2020/0406859 A1* | 12/2020 | Hassani | ................ | H04L 9/3213 |
| 2021/0266988 A1* | 8/2021 | Staats | .................... | H04W 12/06 |

FOREIGN PATENT DOCUMENTS

| | | |
|---|---|---|
| CN | 109383449 | 2/2019 |
| TW | M248663 | 11/2004 |
| TW | 201800283 | 1/2018 |
| TW | 201928770 | 7/2019 |

* cited by examiner

VEHICLE CONTROL METHOD AND SMART CAR KEY

FIELD

The subject matter herein generally relates to vehicle control methods, and more particularly to a vehicle control method and a smart car key.

BACKGROUND

Currently, an authentication system for controlling a vehicle through a mobile terminal (such as a mobile phone) is complicated. For example, mobile terminals often need to be paired with a central control console of the vehicle for authentication, and the authorization information needs to be stored by a third-party back-end server, which may cause inconvenience in vehicle authentication and easy intrusion and monitoring of the authentication information.

BRIEF DESCRIPTION OF THE DRAWINGS

Implementations of the present disclosure will now be described, by way of embodiments, with reference to the attached figures.

DETAILED DESCRIPTION

Figure 1:
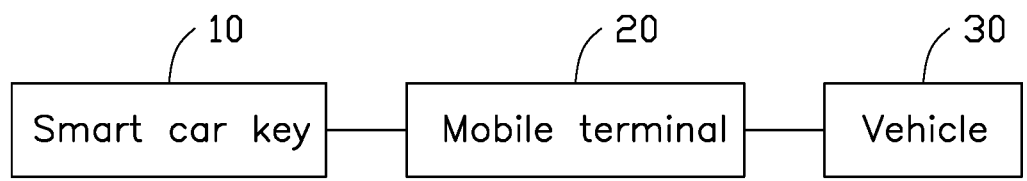
FIG. 1 is an environment diagram of a vehicle control method according to an embodiment of the present disclosure.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series, and the like.

In general, the word "module" as used hereinafter refers to logic embodied in hardware or firmware, or to a collection of software instructions, written in a programming language such as, for example, Java, C, or assembly. One or more software instructions in the modules may be embedded in firmware such as in an erasable-programmable read-only memory (EPROM). It will be appreciated that the modules may comprise coupled logic units, such as gates and flip-flops, and may comprise programmable units, such as programmable gate arrays or processors. The modules described herein may be implemented as either software and/or hardware modules and may be stored in any type of computer-readable medium or other computer storage device.

FIG. 1 shows an environment diagram of a vehicle control method according to an embodiment of the present application. The vehicle control method is applied to a smart car key 10. The smart car key 10 communicates with a mobile terminal 20 and a vehicle 30 to be controlled. The smart car key 10 is used to receive an authorization request sent by the mobile terminal 20 and authorize the mobile terminal 20 to control the vehicle 30 in response to the authorization request. In one embodiment, the mobile terminal 20 includes, but is not limited to, a mobile phone, a wearable device, or a tablet computer.

Figure 2:
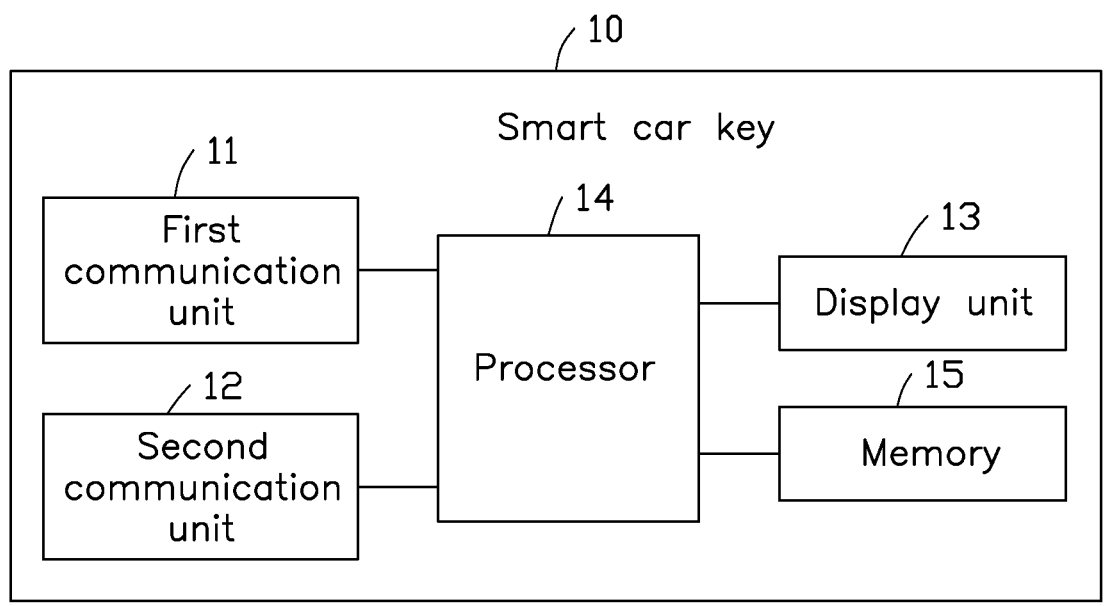
FIG. 2 is a hardware structural diagram of a smart car key according to an embodiment of the present disclosure.

FIG. 2 shows a hardware structural diagram of an embodiment of the smart car key 10. In one embodiment, the smart car key 10 includes a first communication unit 11, a second communication unit 12, a display unit 13, a processor 14, and a memory 15. In one embodiment, the processor 14 is coupled to the first communication unit 11, the second communication unit 12, the display unit 13, and the memory 15. The first communication unit 11 is used for establishing a communication connection between the smart car key 10 and the mobile terminal 20. The second communication unit 12 is used for establishing a communication connection between the smart car key 10 and the vehicle 30. In one embodiment, the first communication unit 11 and the second communication unit 12 are one of a BLUETOOTH module, a Wi-Fi module, and a Near-Field Communication (NFC) tag. In one embodiment, the first communication unit 11 and the second communication unit 12 may be the same or different.

In one embodiment, the display unit 13 is used to display data of the smart car key 10. The display unit 13 is one of a Liquid Crystal Display (LCD), Organic Light-Emitting Diode (OLED), and a Plasma Display Panel (PDP).

The memory 15 is used to store program codes and data of the smart car key 10. In one embodiment, the memory 15 may be an internal storage unit of the smart car key 10. For example, the memory 15 may be a hard disk or memory of the smart car key 10. In another embodiment, the memory 15 may also be an external storage device of the smart car key 10. For example, the memory 15 may be a plug-in hard disk equipped on the smart car key 10, a smart memory card, a secure digital card, a flash memory card, or the like. In one embodiment, the processor 14 may be a central processing unit, a microprocessor, or other data processing chip. The processor 14 is used to execute software program codes or calculation data.

Figure 3:
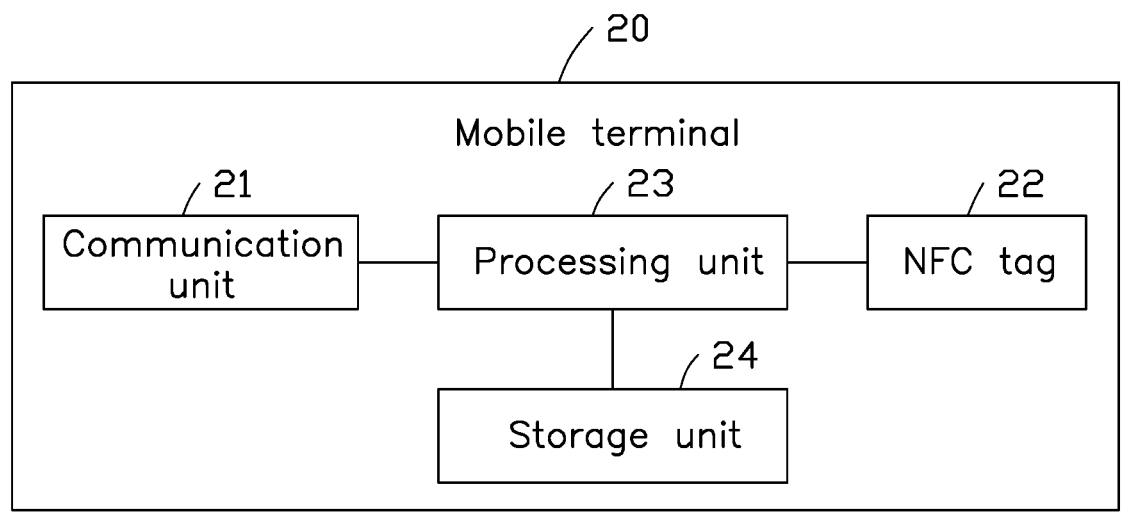
FIG. 3 is a hardware structural diagram of a mobile terminal according to an embodiment of the present disclosure.

FIG. 3 shows a hardware structural diagram of the mobile terminal 20 according to an embodiment. The mobile terminal 20 includes a communication unit 21, an NFC tag 22, a processing unit 23, and a storage unit 24. The processing unit 23 is in communication connection with the communication unit 21, the NFC tag 22, and the storage unit 24. In one embodiment, the mobile terminal communicates with the smart car key 10 through the communication unit 21. The communication unit 21 is one of a BLUETOOTH module and a Wi-Fi module. The mobile terminal 20 communicates with the vehicle 30 through the NFC tag 22. The memory 15 is used to store the program codes and data of the smart car key 10. In one embodiment, the storage unit 24 may be an internal storage unit of the mobile terminal 20. For example, the storage unit 24 may be an internal memory of the mobile terminal 20. The storage unit 24 may also be an external storage device of the mobile terminal 20. For example, the storage unit 24 may be a plug-in hard disk, a smart memory card, a secure digital card, a flash memory card, or the like equipped on the mobile terminal 20. In one embodiment, the processing unit 23 may be a central processing unit, a microprocessor, or other data processing chip.

Figure 4:
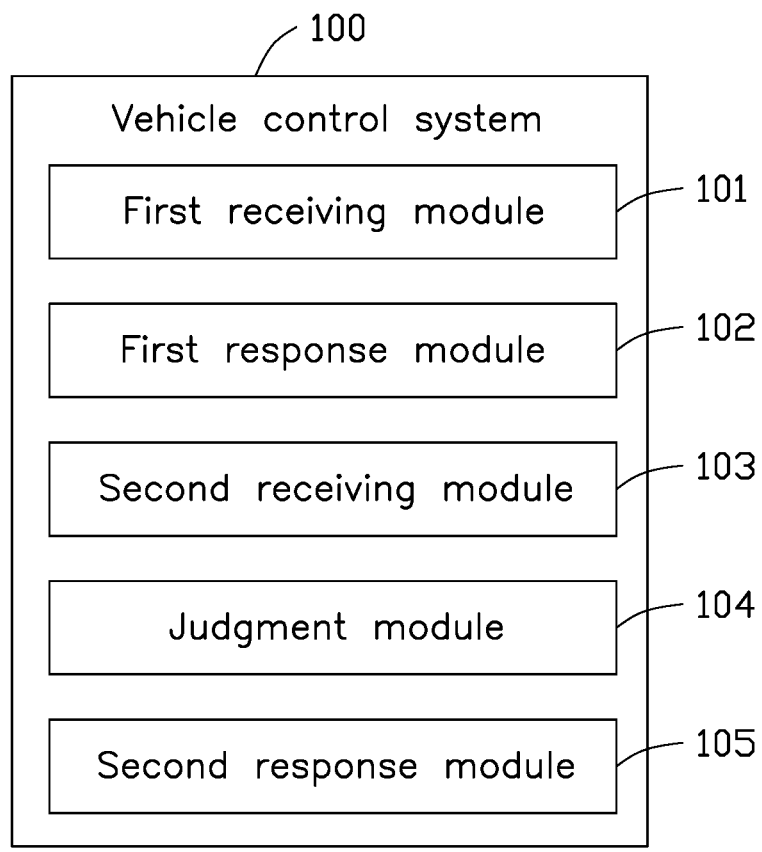
FIG. 4 is a functional block diagram of a vehicle control system according to an embodiment of the present disclosure.

FIG. 4 shows a functional block diagram of the vehicle control system 100 according to an embodiment. In one embodiment, the vehicle control system 100 includes one or more modules, and the one or more modules are stored in the memory 15 of the smart car key 10 and executed by the processor 14. In other embodiments, the vehicle control system 100 is a program embedded in the smart car key 10. In one embodiment, the vehicle control system 100 includes a first receiving module 101, a first response module 102, a second receiving module 103, a judgment module 104, and a second response module 105. The modules refer to a series of computer program instruction segments that can complete specific functions.

The first receiving module 101 receives a connection request sent by the mobile terminal 20.

The first response module 102 responds to the connection request to establish a communication connection with the mobile terminal 20.

In one embodiment, the first receiving module 101 receives the connection request sent by the mobile terminal 20 through a BLUETOOTH module. The first response module 102 performs BLUETOOTH pairing between the smart car key 10 and the mobile terminal 20 in response to the connection request to establish a communication connection between the smart car key 10 and the mobile terminal 20.

The second receiving module 103 receives identity information and an authorization request sent by the mobile terminal 20.

In one embodiment, the second receiving module 103 displays an identification code on the display unit 13 for the mobile terminal 20 to scan. The mobile terminal 20 sends the identity information and authorization request to the smart car key 10 after scanning the identification code. The second receiving module 103 receives the identity information and authorization information sent by the mobile terminal 20 after scanning the identification code. In one embodiment, the identification code is one of a QR code and a barcode.

The judgment module 104 determines whether the identity information is correct.

In one embodiment, the judgment module 104 displays the identity information for a user to determine whether the identity information is correct, and determines whether the identity information is correct in response to receiving an instruction input by the user.

In another embodiment, the judgment module 104 pre-stores target identity information, determines whether the identity information matches the target identity information, and determines that the identity information is correct when the identity information matches the target identity information.

The second response module 105 is configured to send pairing information to the mobile terminal 20 in response to the authorization request when the identity information is correct, send the identity information to the vehicle 30, and control the vehicle 30 through the pairing information and the identity information to perform at least one operation. In one embodiment, the pairing information is an authorization information book that the vehicle 30 grants the mobile terminal 20 to operate the vehicle 30. In one embodiment, the at least one operation includes turning on the power, turning off the power, unlocking the door, and locking the door.

Figure 5:
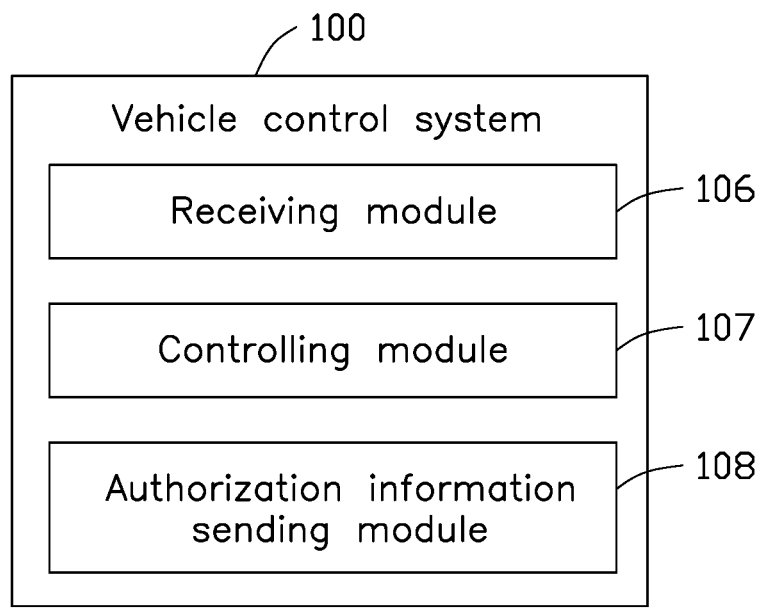
FIG. 5 is a functional block diagram of a vehicle control system in another embodiment of the present disclosure.

FIG. 5 shows a functional module diagram of a vehicle control system 100 according to another embodiment. In one embodiment, the vehicle control system 100 includes one or more modules, and the one or more modules are stored in the storage unit 24 of the mobile terminal 20 and executed by the processing unit 23. In other embodiments, the vehicle control system 100 is a program embedded in the mobile terminal 20. In one embodiment, the vehicle control system 100 includes a receiving module 106, a control module 107, and an authorization information sending module 108. The modules refer to a series of computer program instruction segments that can complete specific functions.

The receiving module 106 receives the pairing information sent by the smart car key 10.

The control module 107 controls the vehicle 30 to perform at least one operation according to the pairing information and the identity information of the mobile terminal 20.

In one embodiment, the control module 107 uses the NFC tag 22 to control the vehicle 30 to perform at least one operation according to the pairing information and the identity information of the mobile terminal 20.

In one embodiment, the authorization information sending module 108 is used to send the identity information and authorization request of the mobile terminal 20 to the smart car key 10. In one embodiment, the authorization information sending module 108 is configured to obtain the identity information and authorization request of the mobile terminal 20 through the input interface 40 after the mobile terminal 20 scans the identification code displayed by the smart car key 10, and then send the identity information and authorization request to the smart car key 10 through the communication unit 21.

Figure 6:
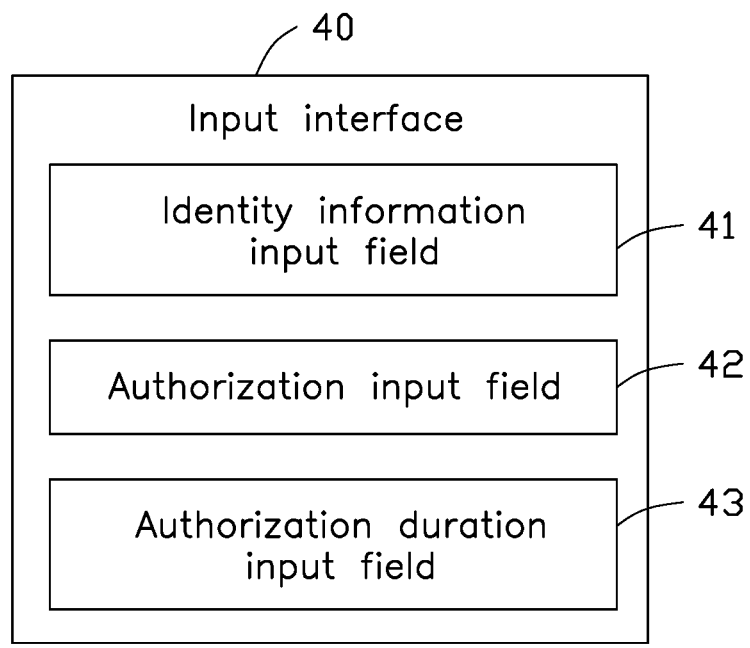
FIG. 6 is a schematic diagram of an input interface according to an embodiment of the present disclosure.

FIG. 6 shows a schematic diagram of an input interface 40 according to an embodiment. The input interface 40 includes an identity information input field 41, an authorization input field 42, and an authorization duration input field 43. The authorization information sending module 108 obtains the identity information of the mobile terminal 20 through the identity information input field 41, obtains the authorization information through the authorization input field 42, and obtains authorization duration information corresponding to the authorization information through the authorization duration input field 43. The authorization information sending module 108 sends the identity information, the authorization information, and the authorization duration information corresponding to the authorization information of the mobile terminal 20 to the smart car key 10 through the communication unit 21. In one embodiment, the authorization information and the authorization duration information corresponding to the authorization information constitute the authorization request.

Figure 7:
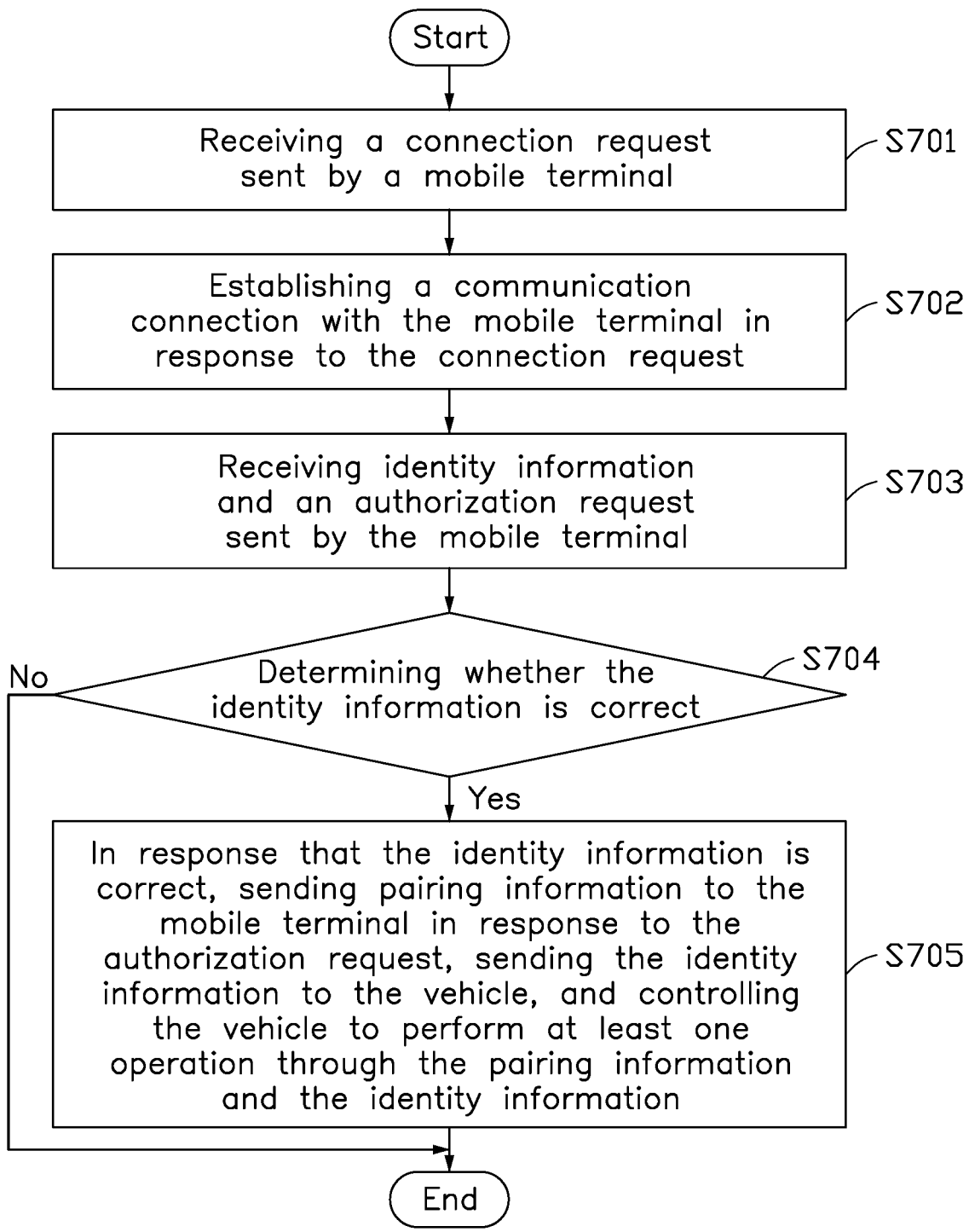
FIG. 7 is a flowchart of a vehicle control method according to an embodiment of the present disclosure.

FIG. 7 shows a flowchart of a vehicle control method according to an embodiment of the present disclosure. The method is applied to the smart car key 10. According to different needs, the order of blocks in the flowchart can be changed, and some blocks can be omitted or combined. The method includes the following blocks.

At block S701, a connection request sent by a mobile terminal is received.

At block S702, a communication connection is established with the mobile terminal in response to the connection request.

In one embodiment, the smart car key 10 receives a connection request sent by the mobile terminal through a BLUETOOTH module. In response to the connection request, the smart car key performs BLUETOOTH pairing between the smart car key and the mobile terminal to establish a communication connection between the smart car key and the mobile terminal.

At block S703, the identity information and authorization request sent by the mobile terminal are received.

In one embodiment, the smart car key displays an identification code on a display unit for the mobile terminal to scan. The mobile terminal sends the identity information and authorization request to the smart car key after scanning the identification code. The smart car key receives the identity information and authorization information sent by the mobile terminal after scanning the identification code. In one embodiment, the identification code is one of a QR code and a barcode.

At block S704, whether the identity information is correct is determined.

In one embodiment, the smart car key displays the identity information for a user to determine whether the identity information is correct, and determines whether the identity information is correct according to an instruction input by the user.

In another embodiment, the smart car key pre-stores target identity information, determines whether the identity information matches the target identity information, and determines that the identity information is correct when the identity information matches the target identity information.

At block S705, in response that the identity information is correct, pairing information is sent to the mobile terminal in response to the authorization request, the identity information is sent to the vehicle, and the vehicle is controlled to perform at least one operation through the pairing information and the identity information.

Figure 8:
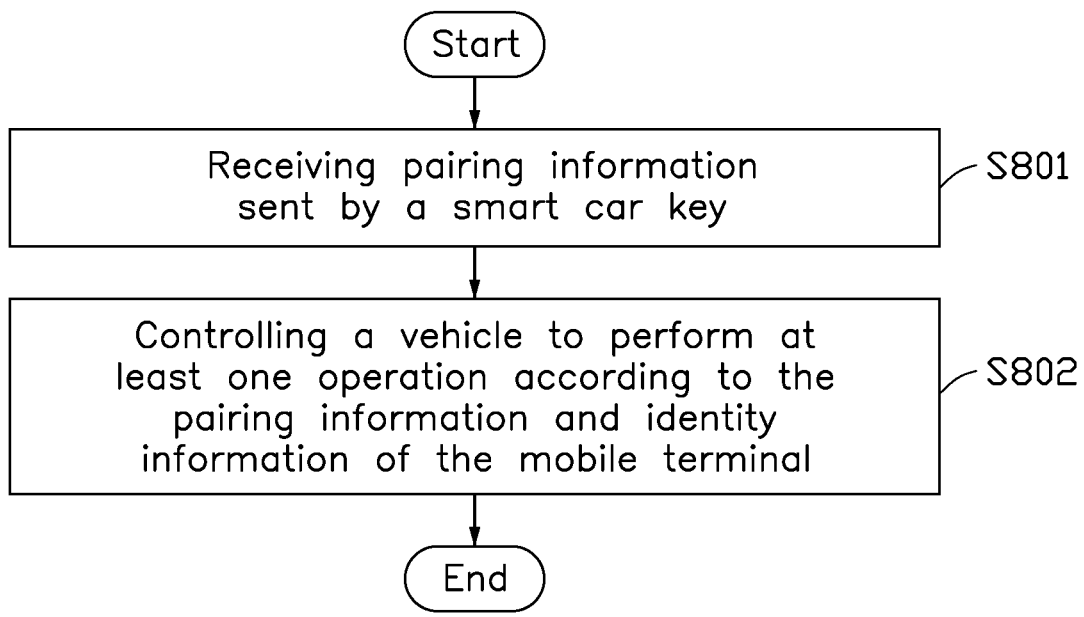
FIG. 8 is a flowchart of a vehicle control method according to another embodiment of the present disclosure.

FIG. 8 shows a flowchart of a vehicle control method according to another embodiment. The method is applied to a mobile terminal. The method includes the following blocks.

At block S801, pairing information sent by a smart car key is received.

At block S802, a vehicle is controlled to perform at least one operation according to the pairing information and identity information of the mobile terminal.

In one embodiment, the mobile terminal uses an NFC tag to control the vehicle to perform at least one operation according to the pairing information and the identity information of the mobile terminal.

In one embodiment, the method further includes:

Sending the identity information and authorization request of the mobile terminal to the smart car key. In one embodiment, when the mobile terminal scans the identification code displayed by the smart car key, the identity information and authorization request of the mobile terminal are obtained through an input interface, and a communication unit sends the identity information and authorization request to the smart car key. In one embodiment, the mobile terminal obtains the identity information of the mobile terminal through an identity information input field, obtains the authorization information through an authorization input field, and obtains authorization duration information corresponding to the authorization information through an authorization duration information input field, and sends the identity information, the authorization information, and the authorization duration information of the mobile terminal through a communication unit to the smart car key. In one embodiment, the authorization information and the authorization duration information corresponding to the authorization information constitute the authorization request.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A vehicle control method applicable to a smart car key, comprising:
    receiving a connection request sent by a mobile terminal;
    establishing a communication connection with the mobile terminal in response to the connection request;
    receiving identity information and an authorization request sent by the mobile terminal, wherein the authorization request is constituted by authorization information and an input relating time duration corresponding to the authorization information;
    determining whether the identity information is correct; and
    in response that the identity information is correct, sending pairing information to the mobile terminal in response to the authorization request, sending the identity information to a vehicle to be controlled, and controlling the vehicle through the pairing information and the identity information to perform at least one operation.

2. The vehicle control method of claim 1, wherein the at least one operation comprises unlocking a door and turning on a power, or the at least one operation comprises turning off the power and locking the door, the smart car key receives the identity information and the authorization request sent by the mobile terminal by:
    displaying an identification code for the mobile terminal to scan; and
    receiving the identity information and the authorization request sent by the mobile terminal after scanning the identification code.

3. The vehicle control method of claim 1, wherein determining whether the identity information is correct comprises:
    displaying the identity information for a user to determine whether the identity information is correct; and
    determining whether the identity information is correct according to an instruction input by the user.

4. The vehicle control method of claim 1, wherein determining whether the identity information is correct comprises:
   determining whether the identity information matches pre-stored target identity information; and
   in response that the identity information matches the pre-stored target identity information, determining that the identity information is correct.

5. A vehicle control method applied to a mobile terminal, comprising:
   sending a connection request to a smart car key;
   receiving pairing information sent by the smart car key after the smart car key establishes a communication connection between the smart car key and the mobile terminal in response to the connection request;
   obtaining identity information of the mobile terminal through an identity information input field of an input interface, obtaining authorization information through an authorization input field of the input interface, and obtaining an input relating time duration corresponding to the authorization information through an authorization duration input field of the input interface;
   sending the identity information and an authorization request to the smart car key, wherein the authorization request is constituted by the authorization information and the input relating time duration corresponding to the authorization information; and
   controlling a vehicle to perform at least one operation according to the pairing information and identity information of the mobile terminal.

6. The vehicle control method of claim 5, wherein the at least one operation comprises unlocking a door and turning on a power, or the at least one operation comprises turning off the power and locking the door, the mobile terminal controls the vehicle to perform at least one operation according to the pairing information and the identity information of the mobile terminal by:
   controlling the vehicle through a Near-Field Communication (NFC) tag to perform the at least one operation according to the pairing information and the identity information of the mobile terminal.

7. A smart car key comprising:
   a processor;
   and
   a memory storing a plurality of instructions, which when executed by the processor, cause the processor to:
      receive a connection request sent by a mobile terminal;
      establish a communication connection with the mobile terminal in response to the connection request;
      receive identity information and an authorization request sent by the mobile terminal, wherein the authorization request is constituted by authorization information and an input relating time duration corresponding to the authorization information;
      determine whether the identity information is correct; and
      in response that the identity information is correct, send pairing information to the mobile terminal in response to the authorization request, send the identity information to a vehicle to be controlled, and control the vehicle through the pairing information and the identity information to perform at least one operation.

8. The smart car key of claim 7, wherein the processor is further configured to:
   display an identification code for the mobile terminal to scan; and
   receive the identity information and the authorization request sent by the mobile terminal after the identification code is scanned.

9. The smart car key of claim 7, wherein the processor is further configured to:
   display the identity information for a user to determine whether the identity information is correct; and
   receive an instruction input by the user to determine whether the identity information is correct.

10. The smart car key of claim 7, wherein the at least one operation comprises unlocking a door and turning on a power, or the at least one operation comprises turning off the power and locking the door.

* * * * *